United States Patent
Bootsma, Jr. et al.

(10) Patent No.: US 8,288,904 B1
(45) Date of Patent: Oct. 16, 2012

(54) DEVICES AND METHODS FOR MECHANICALLY COUPLING MAGNETIC FIELD INDUCED MOTION

(75) Inventors: Pieter Bootsma, Jr., Oakland Gardens, NY (US); Justin Aiello, Kennebunk, ME (US); Stanley Stromski, Riverhead, NY (US)

(73) Assignee: Neodymium Energy LLc., Melville, NY (US)

( * ) Notice: Subject to any disclaimer, the term of this patent is extended or adjusted under 35 U.S.C. 154(b) by 506 days.

(21) Appl. No.: 12/624,806

(22) Filed: Nov. 24, 2009

Related U.S. Application Data

(60) Provisional application No. 61/117,430, filed on Nov. 24, 2008.

(51) Int. Cl.
*H02K 7/06* (2006.01)
*H02K 49/00* (2006.01)
*H02K 21/00* (2006.01)

(52) U.S. Cl. ............... 310/80; 310/103; 310/152
(58) Field of Classification Search .......... 310/80, 310/103, 152
See application file for complete search history.

(56) References Cited

U.S. PATENT DOCUMENTS

| | | | |
|---|---|---|---|
| 3,935,487 A | 1/1976 | Czerniak | |
| 4,179,633 A | 12/1979 | Kelly | |
| 4,196,365 A | 4/1980 | Presley | |
| 4,517,477 A | 5/1985 | Pankratz | |
| 4,598,221 A | 7/1986 | Lawson et al. | |
| 6,274,959 B1 | 8/2001 | Uchiyama | |
| 6,433,452 B1 | 8/2002 | Graham | |
| 6,455,975 B1 * | 9/2002 | Raad et al. | 310/209 |
| 6,811,106 B2 * | 11/2004 | Aikawa | 241/261.1 |
| 2005/0116579 A1 * | 6/2005 | Ohiwa et al. | 310/254 |

* cited by examiner

*Primary Examiner* — Quyen Leung
*Assistant Examiner* — Jose Gonzalez Quinones
(74) *Attorney, Agent, or Firm* — Rothwell, Figg, Ernst & Manbeck, PC

(57) ABSTRACT

Apparatuses for coupling magnetic forces into motive force are disclosed having a spinner arm, a power bed, and a hub. The spinner arm has a helical array of magnets mounted about a shaft. The apparatus also has a rotational timing coupling such as a stationary rack and spinner shaft pinion. The power bed has two arrays of magnets defining a power track. The spinner arm shaft may be mounted in the hub, allowing rotation of the spinner arm about its axis. The hub is further constructed to allow the hub and spinner arm to move translationally within a plane parallel to a plane containing the power bed. High coercive force magnets in the spinner and power bed interact to displace the spinner arm and rotate it about its axis. Multiple spinner arms and power beds may be arranged to move a load linearly or drive a load about an axis.

16 Claims, 9 Drawing Sheets

DEVICES AND METHODS FOR MECHANICALLY COUPLING MAGNETIC FIELD INDUCED MOTION

CROSS-REFERENCE TO RELATED APPLICATION

The present application claims the benefit of Provisional Patent Application No. 61/117,430 filed Nov. 24, 2008, which is hereby incorporated by reference herein.

BACKGROUND

1. Field of the Invention

The present invention relates to devices and structures for mechanically coupling forces induced by interacting magnetic fields into motive forces which may be coupled to a generator or other load. The present invention further relates to magnetic coupling units having particular dynamic arrangements.

2. Discussion of Related Art

It is recognized in the art that magnets interact with attractive and repulsive forces and that these forces can be used to perform useful work. Such work may include rotation of a shaft and linear movement of a mass. Magnetic motors illustrating this principle are disclosed, for example, in U.S. Pat. Nos. 6,274,959, 4,598,221, 4,196,365, and 4,179,633.

A driving apparatus disclosed in U.S. Pat. No. 6,274,959 has a rotatable disk with a magnet alley and an arrangement of peripheral permanent magnets. A reciprocal device also has a magnet alley that includes reciprocating permanent magnets which interact with the peripheral permanent magnets. Each reciprocating magnet is movable between two positions to attract and repel a peripheral permanent magnet as it rotates in proximity to the reciprocating magnet.

U.S. Pat. No. 4,598,221 discloses a permanent magnet motion conversion device having a ring stator with stator magnets aligned along its circumference and a rotor with permanent magnets. The rotor magnets rock about an axis as the rotor turns.

U.S. Pat. No. 4,196,365 discloses a magnetic motor having a shaft mounted rotating disc on which are mounted three permanent magnets oriented and spaced radially. A stationary bracket has two permanent magnets mounted in proximity to the disc such that the magnetic fields of the bracket magnets and the rotor magnets can interact. The bracket is attached to a reciprocating device which changes the distance of the bracket magnets to the rotor in relation to the rotation of the rotor.

U.S. Pat. No. 4,179,633 discloses a permanent magnet wheel drive having a flat wheel containing peripherally mounted identical magnet segments and a concentric magnetic driving device having multiple pairs of identical magnet segments mounted on rockers.

Common to each of these prior art patents are elements which mechanically reciprocate or rock in an attempt to change the orientation of a magnetic field or to block or allow extension of a magnetic field so as to achieve productive magnetic field interactions and avoid unproductive magnetic field interactions. Such mechanically reciprocating and rocking elements create inefficiencies, reducing the amount of work which may be performed. Moreover, such elements increase the complexity of the devices, leading to high expense in their construction and maintenance. Such complexity also means that the devices are not effectively scalable, i.e., it is not effective to combine a multiplicity of such devices to perform greater amounts of work. Thus, it is a goal of the present invention to overcome the above stated disadvantages.

SUMMARY OF THE INVENTION

In accordance with an embodiment of the present invention, there is provided an apparatus for coupling magnetic forces into motive force. The apparatus has a spinner arm, a power bed, and a hub. The spinner arm has a helical array of spinner magnets having an axis of rotation coincident with its helical axis, a spinner arm shaft onto which the helical array of spinner magnets is mounted. The axis of the spinner arm shaft is coincident with the helical axis and allows the helical array to rotate about its axis. The apparatus also has a rotational timing coupling. The power bed has an inner array of magnets and an outer array of magnets in which the inner and outer arrays define a power track of respective lines and the lines define a power bed plane. The spinner arm shaft is inserted into the hub, allowing rotation of the spinner arm about its axis. The hub is further constructed to allow the hub and spinner arm to move in a translational direction within a plane parallel to the power bed plane and substantially along the power track defined by the power bed. The apparatus also includes a translational timing coupling coupled to the rotational timing coupling of the spinner arm.

In one configuration, the spinner arm is orientable in a first displacement away from the power bed and the helical array of magnets is orientable in a first angular orientation, such that an attractive magnetic force between the power bed and the spinner arm attracts the spinner arm towards the power bed and the respective timing couplings permit the spinner arm to rotate about the spinner arm axis in relation to a displacement of the spinner arm.

The spinner arm is also orientable in a second displacement proximal to the power bed and the helical array of magnets is orientable in a second angular orientation, such that a repelling magnetic force between the power bed and the spinner arm repels the spinner arm from the second displacement position and away from the power bed in the translational direction.

In another configuration, the spinner arm is orientable in a displacement away from the power bed, with the helical array of magnets oriented in an angular orientation, such that an repulsive magnetic force exists between the power bed and the spinner arm. The repulsive magnetic force is less than a repulsive force in the second displacement and second angular orientation.

Moreover, in accordance with an embodiment of the present invention, a load may be coupled to the hub. Such a load may include a generator.

In accordance with another embodiment of the apparatus, the apparatus further includes a stator plate to which the power bed and translational timing coupling are fastened a shaft perpendicular to the stator plate. The hub is coupled to the perpendicular shaft, the power bed plane and a plane defined by the stator plate are parallel, the power track comprises substantially concentric arcs, the translational movement of the spinner arm causes the hub to rotate the perpendicular shaft, and the load is coupled to the perpendicular shaft. In some embodiments, the load is a generator.

DETAILED DESCRIPTION OF PREFERRED EMBODIMENTS

Figure 1:
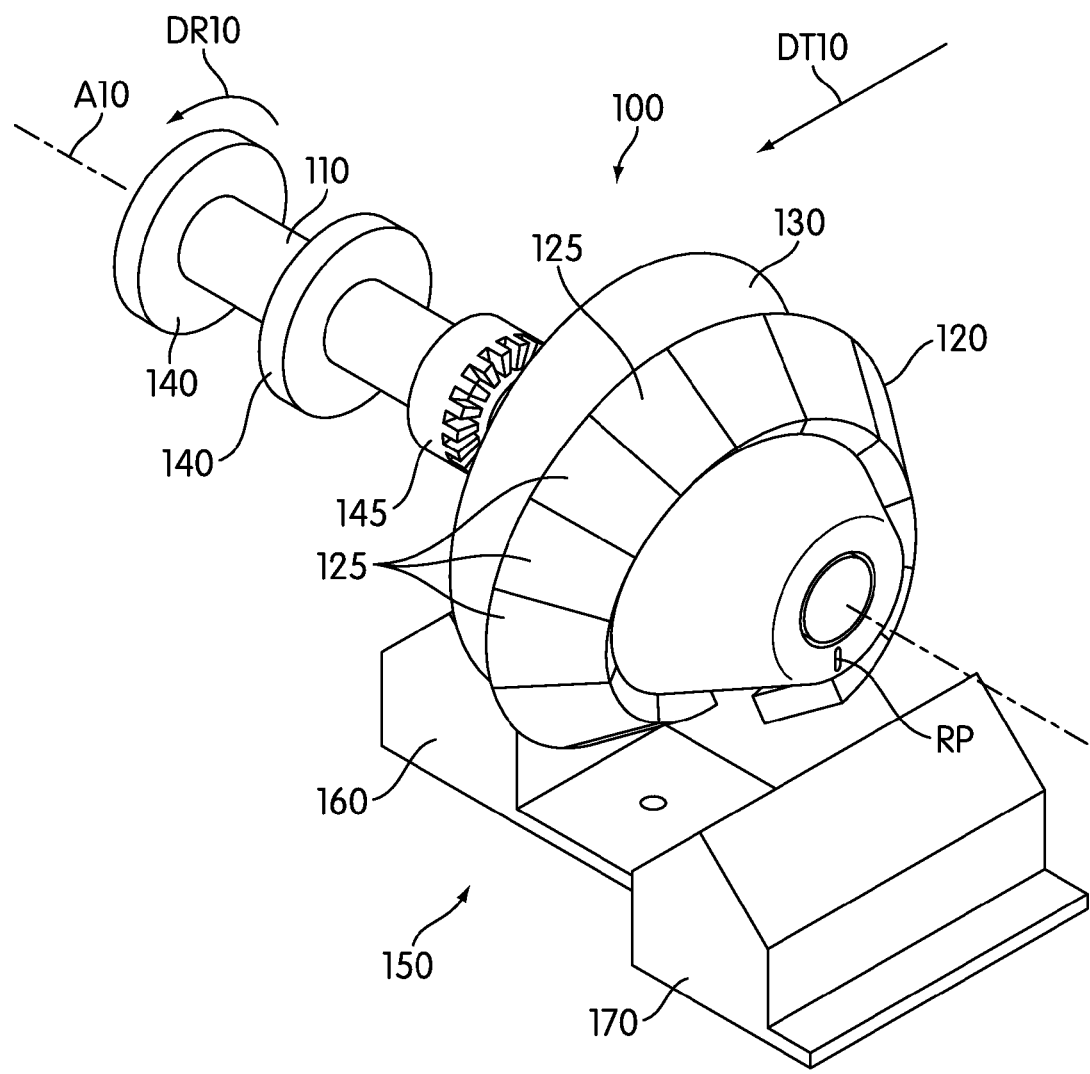
FIG. 1 illustrates an exemplary arrangement of magnets in accordance with an aspect of the present invention.

With reference to FIG. 1, a spinner arm 100 and power bed 150 are illustrated in accordance with one embodiment of the invention. Spinner arm 100 is constructed to spin about an axis A10 defined by shaft 110 in direction DR10. Spinner arm 100 includes a tapered helical array 120 of spinner magnets 125. Tapered helical array 120 may comprise substantially a single revolution around the spinner arm axis and may be mounted on a support structure such as cone 130. Spinner arm 100 may further include bearings 140 and pinion gear 145. FIG. 1 further illustrates a power bed 150. In one embodiment, this power bed 150 may include two arrays of magnets, inner array 160 and outer array 170. In other embodiments, power bed 150 may include one magnet array or more than two magnet arrays.

In one embodiment, shaft 110 is cylindrically shaped and constructed of non-ferrous material, preferably aluminum, with a standard stock diameter readily available from suppliers. In a preferred embodiment, shaft 110 is black oxide plated, preventing pitting and oxidation. Bearings 140 may be made of stainless steel and in sizes readily available from suppliers.

Spinner arm 100 and power bed 150 are mounted relative to each other such that spinner arm 100 is able to move in translational direction DT10 while power bed 150 is relatively fixed. The spinner magnets 125 in tapered helical array 120 and the magnets in power bed 150 interact to induce spinner arm 100 to move in translational direction DT10. At the same time, spinner arm 100 and power bed 150 are mounted relative to each other such that shaft 110 rotates in direction DR10 about axis A10 as the entire spinner arm 100 assembly moves in translational direction DT10. For reference, reference point RP is shown in FIG. 1 on the apex of cone 130, indicating a relative angular orientation of tapered helical array 120 of 0° about axis A10.

Figure 2C:
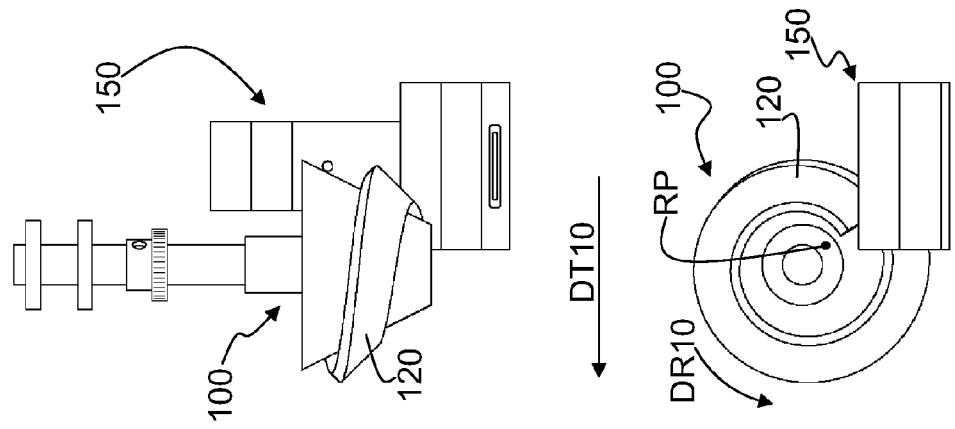
FIGS. 2A-2C illustrate a relationship between a spinner arm translational position and helical array angular position in accordance with an aspect of the present invention.
Figure 2B:
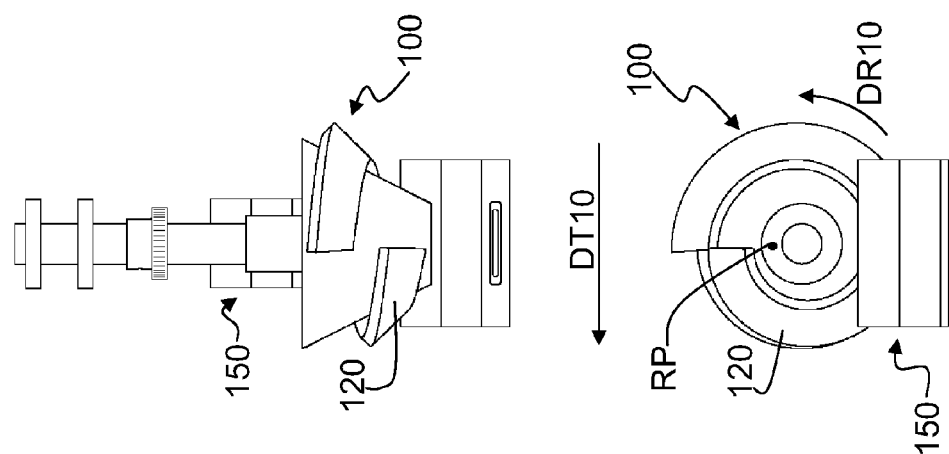
Figure 2A:
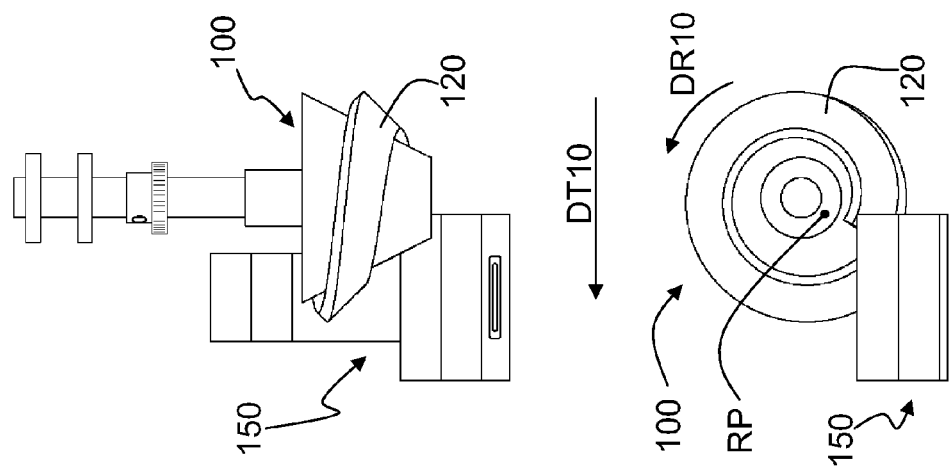

FIGS. 2A-C illustrate, with corresponding plan and elevation views, the approximate angular orientations of tapered helical array 120 as spinner arm 100 approaches, transits, and exits power bed 150, for one embodiment. In this embodiment, as illustrated in FIG. 2A, spinner arm 100 moves translationally in direction DT10 relative to power bed 150 and tapered helical array 120 has a relative angular orientation of approximately −22° as it becomes proximal to power bed 150. As spinner arm 100 continues to move translationally in direction DT10, transiting through power bed 150, it is rotating in direction DR10, advancing the angular orientation of tapered helical array 120 to approximately 180° at a mid-transit point as illustrated in FIG. 2B. As the rotation and translation of spinner arm 100 continues and it exits power bed 150, the angular orientation of tapered helical array 120 is approximately 22° as illustrated in FIG. 2C.

Figure 3A:
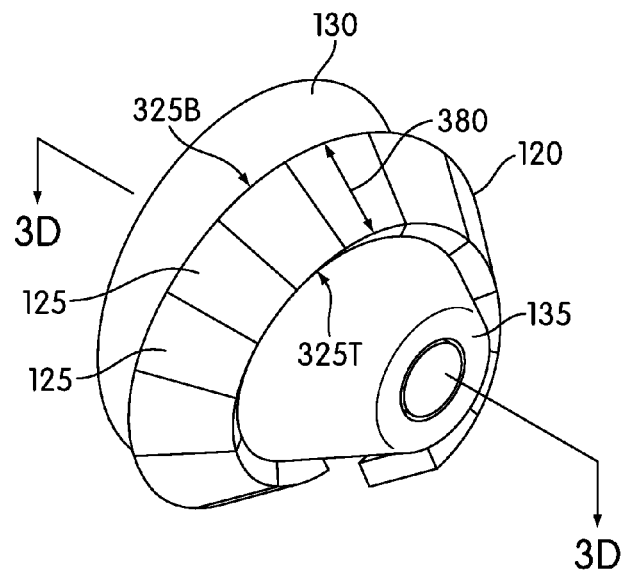
FIGS. 3A-3D illustrate embodiments of a tapered helical array of magnets in accordance with an aspect of the present invention.

As illustrated in FIG. 3A, tapered helical array 120 is comprised of spinner magnets 125 mounted on cone 130. In one exemplary embodiment, cone 130 may be in the shape of a right circular cone with a truncated apex 135. Cone 130 may be composed of a non-magnetic, non-conductive material such as molded thermoplastic. Plastics such as PVC, polycarbonate, thermoplastic resins, and acrylics are preferred. Spinner magnets 125 are preferably rare earth magnets having similar high power flux and high coercive force to the magnets in power bed 150 (further described below). Magnets made of neodymium iron boron (NdFeB), samarium cobalt (SmCo), or ferrites are preferred. In exemplary embodiments, 45 MGOe NdFeB magnets or 28 MGOe SmCo magnets may be used.

Figure 3B:
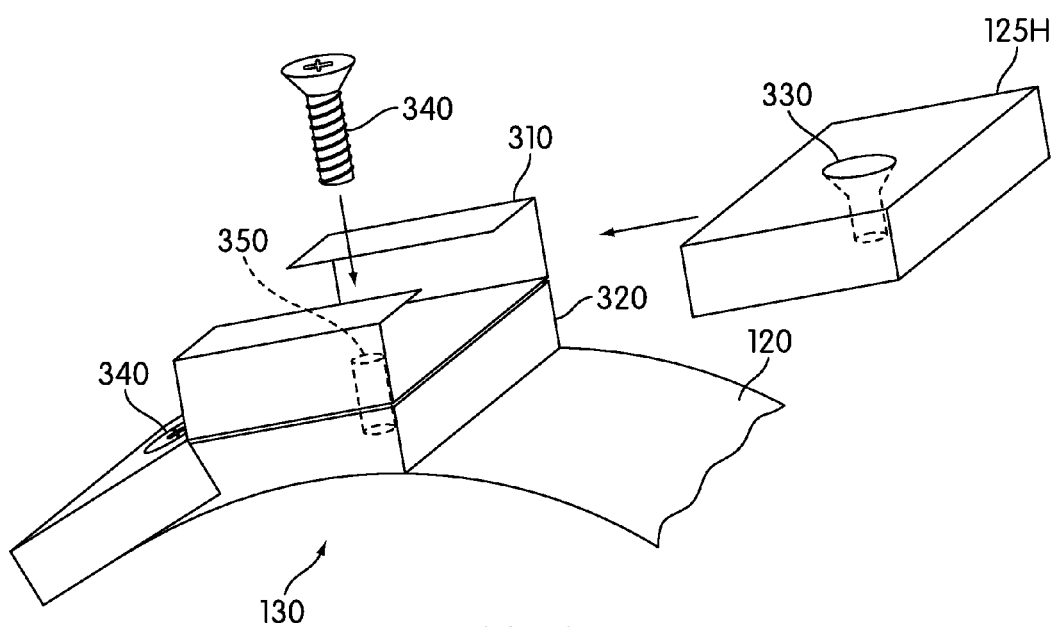

Each magnet 125 may be affixed to cone 130 using a high strength industrial adhesive such as Loctite. Other methods, such as through-hole screws and brackets, may be used alone or in combination with each other and/or with the use of an adhesive. FIG. 3B illustrates an exemplary embodiment in which bracket 310 is mounted on cone 130 along the path of tapered helical array 120. Cone 130 may have an optional milled or molded base structure 320. Magnet 125H may be inserted in to bracket 310. Additionally, or independently, magnet 125H may include a counter sunk through-hole 330 through which flat head screw 340 may be inserted, fastening magnet 125H to cone 130 through cone through-hole 350. In one embodiment, flat head screw 340 is steel. In another embodiment, a flat head steel pop rivet may be substituted for flat head screw 340.

Spinner magnets 125 may be cuboid in shape, having relative height, width, and depth of approximately 1, 1, and 0.25, respectively. In another embodiment, the magnets are rectangular in shape and have a taper running along the length through the thickness of the magnet dimension, the taper having, for example, a 2-1 ratio. In one embodiment, spinner magnets 125 are polarized such that the magnetic poles are perpendicular to the large faces. In one embodiment, spinner magnets 125 are mounted on cone 130 with their south poles oriented outward and directed away from cone 130. In another embodiment, the large faces of spinner magnets 125 are isosceles trapezoids having a narrower end 325T and broader end 325B and are mounted with narrower end 325T oriented in the direction of apex 135, as illustrated in FIG. 3A. Spinner magnets 125 are mounted to cone 130 such that tapered helical array 120 is formed. In one exemplary embodiment, tapered helical array 120 comprises approximately 1 revolution around cone 130 and may have a pitch (i.e., spacing of successive revolutions relative to the axis) of approximately the height of one magnet as in, for example, magnet height 380. In another embodiment the pitch is as much as eight. Tapered helical array 120 is tapered, i.e., its radial distance from its axis is a linear function of its position along the axis, such that it may follow the contour of cone 130.

Figure 3C:
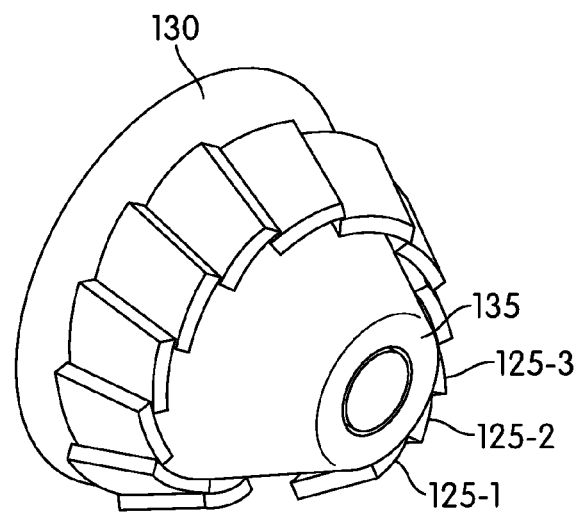

In a preferred embodiment, as illustrated in FIG. 3C, the spinner magnets 125 of tapered helical array 120 are mounted in an overlapping fashion with approximately 2-5% of the magnet faces overlapped. In this embodiment, as in the arrangement shown in FIG. 3A, the large faces of spinner magnets 125 may be trapezoidal. However, the large width of the trapezoid is oriented in the direction of apex 135. Tapered helical array 120 may be assembled by placing a first spinner magnet 125-1 at the apex 135, lapping a leading edge of second spinner magnet 125-2 on the trailing edge of spinner magnet 125-1, lapping a leading edge of third spinner magnet 125-3 on the trailing edge of spinner magnet 125-2, and so on, following the path of a tapered helix to the base of cone 130. Alternatively (not shown), a first spinner magnet may placed at the base of the cone, followed by lapping a trailing edge of a second spinner magnet on the leading edge of the first spinner magnet, followed by lapping a trailing edge of a third spinner magnet on the leading edge of the second spinner magnet, an so on, following the path of a tapered helix to the apex 135.

Figure 3D:
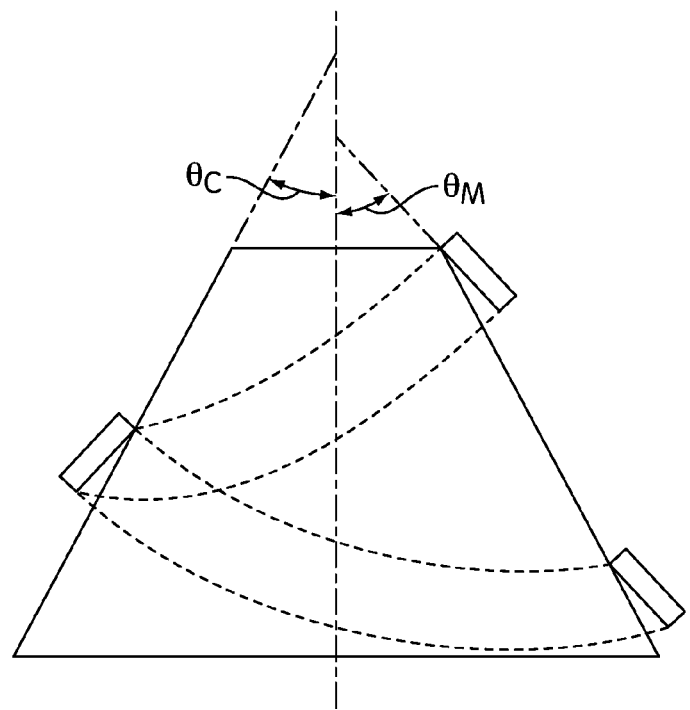

As illustrated in FIG. 3D, depicting cross section D-D of FIG. 3A through the axis of the cone 130, a cross sectional edge of cone 130 forms angle $\theta_C$ with the axis of cone 130 and spinner magnets 125 form angle $\theta_M$ with the axis of cone 130. In a preferred embodiment $\theta_M$ is constant along the length of tapered helical array 120, may be up to 60°, and is most preferably approximately 45°. Angle $\theta_C$ is generally equal to or smaller than $\theta_M$.

In other aspects, spinner magnets 125 may be attached to spinner shaft 110 via a support structure other than cone 130. For example, spinner magnets 125 can be mounted on a series of supports emanating radially (not shown) from spinner shaft 110.

Figure 4A:
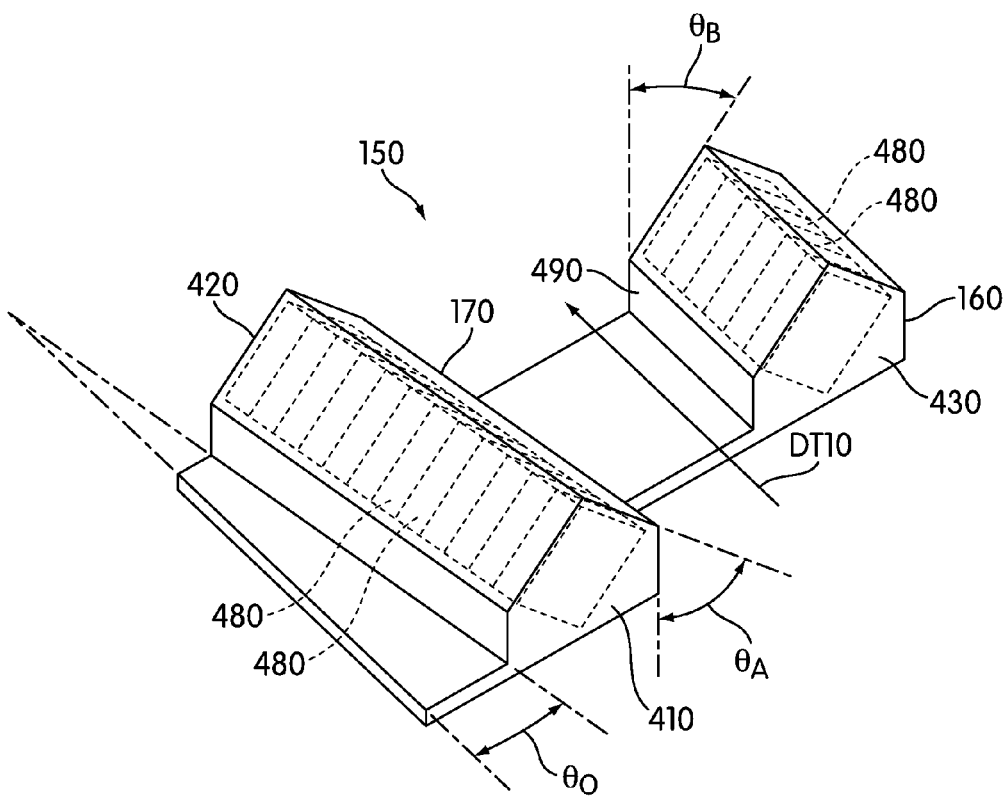
FIGS. 4A-4E illustrate embodiments of power bed magnet arrays in accordance with an aspect of the present invention.

As illustrated in FIG. 4A, power bed 150 is comprised of two arrays of magnets: inner array 160 and outer array 170. In one exemplary embodiment, inner array 160 consists of 6 power bed magnets 480 and outer array 170 consists of 12 power bed magnets 480. In other embodiments inner array 160 may have 3-25 magnets and outer array 170 may have 6-50 magnets. Power bed magnets 480 may be cuboid in shape and have relative dimensions of 1, 1, and 0.25. In other embodiments (not shown), power bed magnets 480 may be triangular, trapezoidal (similar to magnets 125 illustrated in FIG. 3A), or arc segments having a taper running across the width. Power bed magnets 480 are preferably rare earth, including NdFeB, SmCo and hard ferrites of grades C 5 and C 8, and have high power flux and high coercivity. Their magnet poles are preferably oriented perpendicularly to their large faces. In preferred embodiments of each array, inner array 160 and outer array 170, the poles of power bed magnets 480 are oriented in a common direction and typically substantially parallel to DT10; when the leading end 410 of outer array 170 is north in polarity, the leading end 430 of inner array 160 is south in polarity. Power bed 150 optionally comprises power bed housing 490, which encapsulates power bed magnets 480 in a non-magnetic, non-ferrous, and non-conductive material. Suitable materials include PVC, polycarbonate, thermoplastic resins, and acrylics.

In one embodiment, the power bed magnets 480 in outer array 170 may be oriented to have angle $\theta_A$ so as to create an array face which would be substantially parallel to tapered helical array 120, as illustrated in FIG. 4A. In a preferred embodiment, power bed magnets 480 in inner array 160 are oriented such that $\theta_B$ is approximately the same as $\theta_A$. In one embodiment, inner array 160 and outer array 170 are oriented substantially in parallel with the direction of travel DT10 of spinner arm 100. In another embodiment, outer array 170 is angled with angle $\theta_O$ such that leading end 410 is closer to inner array 160 than trailing end 420. In a preferred embodiment, angle $\theta_O$ may be approximately 10-15°.

Figure 4B:
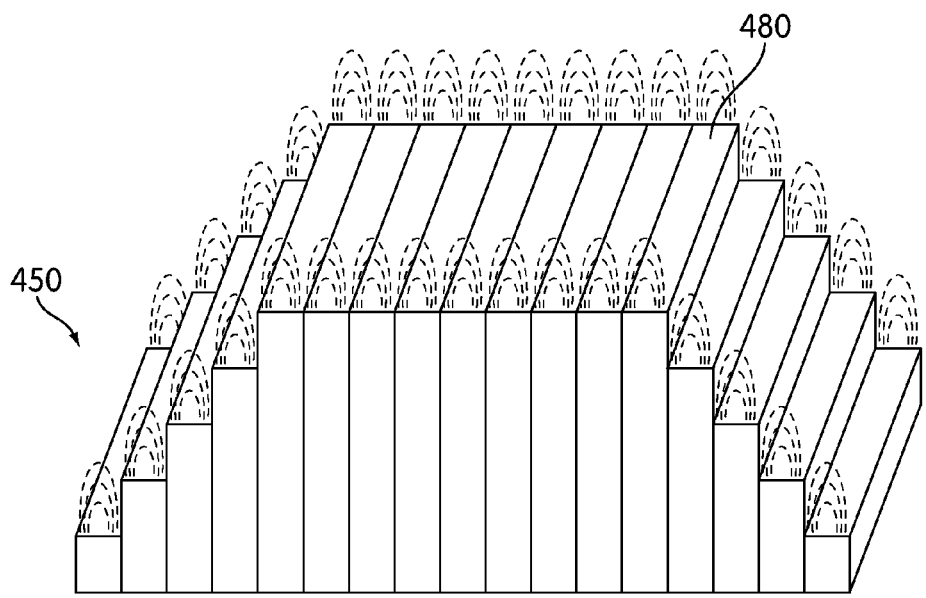
Figure 4C:
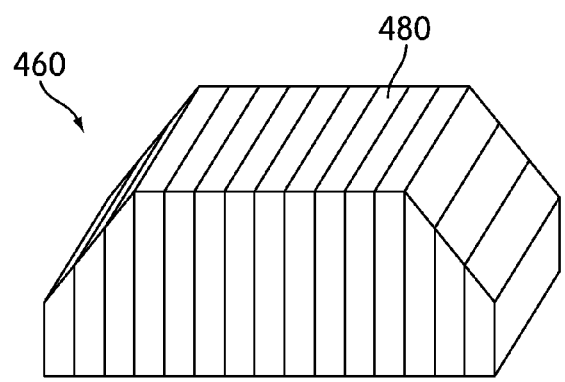

In alternative embodiments of outer array 170, the power bed magnets 480 may be arranged as stepped magnet arrays such as stepped array 450, as illustrated in FIG. 4B or angled magnet arrays such as angled array 460, as illustrated in FIG. 4C. These alternative embodiments allow the magnetic flux to be gradually increased in height and/or strength from one end to a peak in the center of the array and then decreased from the center to the other end. In another embodiment illustrated in FIG. 4E, shunt blocks 495 are added on each side of the array. Shunt blocks 495 may be employed to shunt flux leakage and may be steel blocks.

Figure 4D:
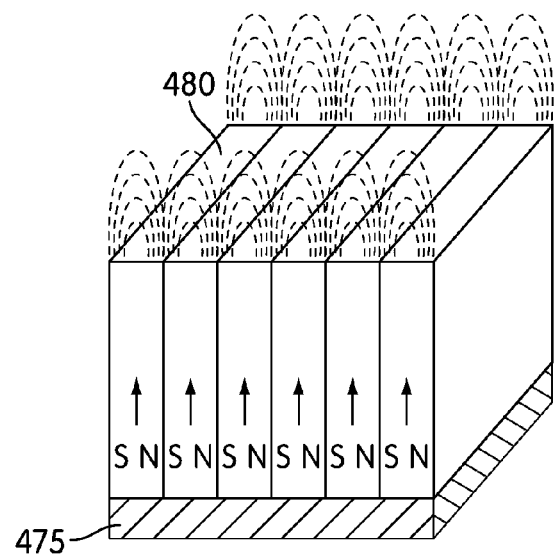
Figure 4E:
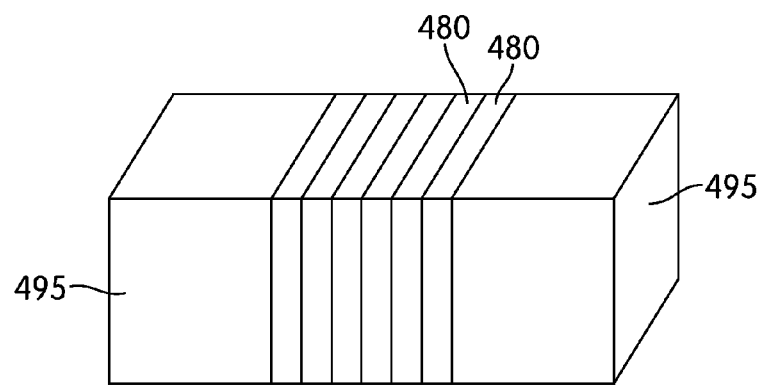

As illustrated in FIG. 4D, the poles of power bed magnets 480 are oriented to provide alternating north and south polarities, creating a narrow flux path on each power bed magnet 480, having a maximum concentration of flux lines on each magnet and narrow peaks with sharp bands. The stepped array 450 (illustrated in FIG. 4B) and angled array 460 (illustrated in FIG. 4C) create a lower flux path at the leading and trailing ends of the arrays. In these preferred embodiments, the power bed 150 creates a specific flux path that smoothes the entry of and decreases the entry resistance to spinner arm 100 on leading end 420 and repels the spinner arm on the trailing end 410 as the spinner arm 100 rotates in the clockwise rotation about its axis.

In other embodiments, the power bed magnets 480 may be mounted on a low carbon steel plate 475 to increase magnetic flux at the top of the array, as illustrated in FIG. 4D. Low carbon steel plate 475 may be sized to match an array's footprint and mated to an inner and/or outer array of magnets such as, for example, stepped array 450 or angled array 460.

Power bed 150 may be mounted on a substrate (not shown) with non-magnetic type fasteners (not shown) such as stainless steel or brass screws instead of non-magnetic rivets. Screws are preferred because they permit easy assembly and disassembly as well as ease of alignment of a power bed 150 on a substrate.

In accordance with one configuration of an embodiment of the invention, the spinner arm 100 is initially not moving relative to the power bed 150. An initial external force, not shown, is applied to the spinner arm 100 so that it moves in the translational direction towards power bed 150, overcoming any repelling interaction between the spinner arm and power bed 150. Spinner arm 100 rotates about its axis as it moves in relation to power bed 150, dynamically reconfiguring the magnetic interaction between spinner arm 100 and power bed 150. Once proximal to power bed 150, a repelling force pushes spinner arm 100 away from power bed 150 in the translational direction, the repelling force being greater than the initial force.

In accordance with scaled embodiments of the invention, pluralities of spinner arms 100 and power beds 150 may be assembled into structures which scale-up and couple the translational movement of the multiple spinner arms into linear or rotational movement of a load.

Figure 5:
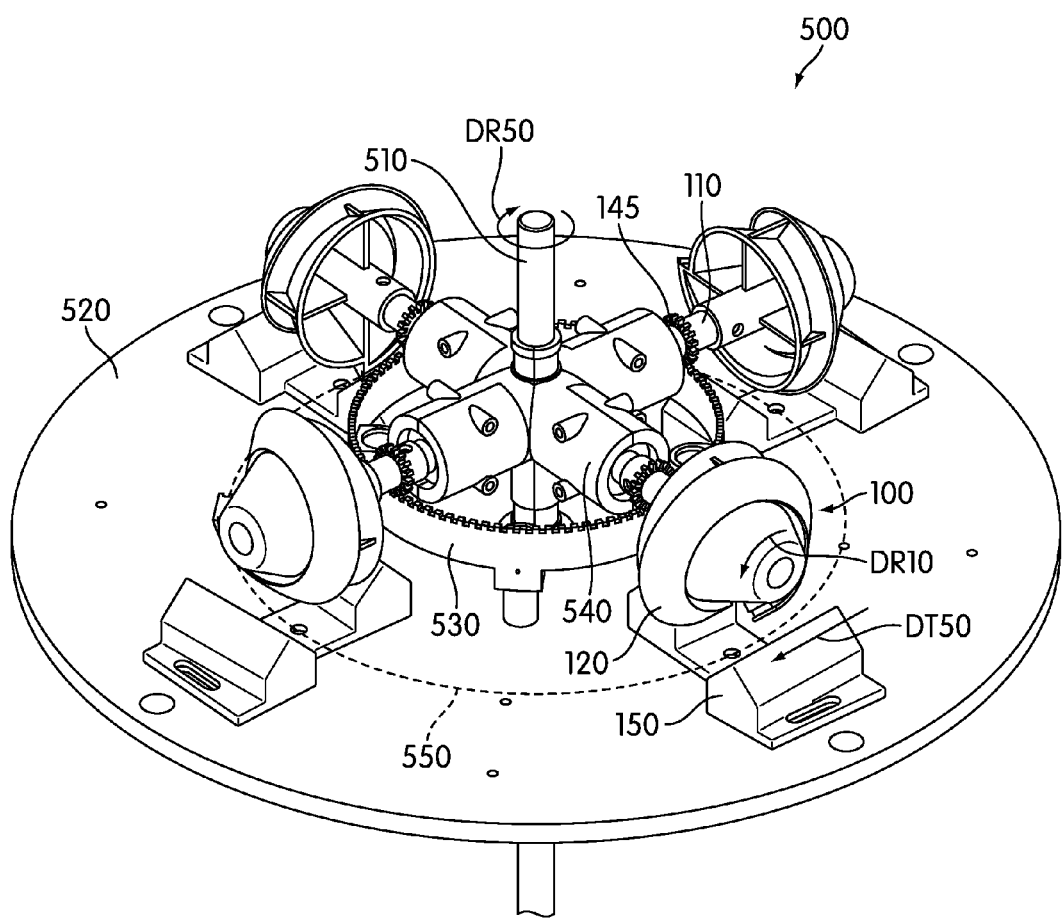
FIG. 5 illustrates a stator plate assembly in accordance with an aspect of the present invention.

FIG. 5 illustrates one such scaled embodiment of the invention that includes a substrate or stator plate 500 to which multiple power beds 150 are fastened. In this exemplary embodiment, a pinion rack 530 is affixed to the stator plate 500 on which ride the pinion gears 145 of each spinner arm 100. Spinner arm 100 is also coupled in hub 540 via bearings 140 so that the spinner arm may rotate about its axis. In the embodiment illustrated in FIG. 5, 4 power beds 150 are affixed to stator plate 500 and 4 spinner arms 100 are coupled to hub 540. The power beds 150 define a circular power track 550 with power beds 150 spaced approximately 90° apart. The hub 540 defines four axes about which spinner arms 100 may rotate; the axes lie in a plane parallel to a plane defined by stator plate 500. As shown in FIG. 5, the axes may be spaced 90° apart. Hub 540 is affixed to stator shaft 510 such that the rotation of hub 540 about the axis defined by stator shaft 510 causes stator shaft 510 to rotate.

Hub 540 may optionally be made in the shape of a cube with bores on each side to accommodate bearings for each spinner arm 100. Hub 540 may be constructed of non-magnetic, non-ferrous materials such as molded plastics, brass, stainless steel Austenitic types, for example, types 304 or 316, or aluminum. In a preferred embodiment, hub 540 is constructed of aluminum having oxide plating, providing easy machining, cost effectiveness, light weight, lower labor costs and non-oxidation.

The operation of this exemplary embodiment depicted in FIG. 5 is described as follows. In one configuration, spinner arms 100 are positioned an initial distance from corresponding power beds 150. An initial external force is applied to the system such that tapered helical array 120 and spinner arms 100 are advanced towards power beds 150, rotating hub 540 and shaft 510 clockwise in direction DR50. This rotation of spinner arms 100 around the axis defined by stator shaft 510 moves tapered helical arrays 120 translationally in direction DT50. As the hub 540 and spinner arms 100 assembly rotate about the stator shaft 510 axis, spinner arms 100 and shafts 110 are forced to rotate about their axes in direction DR10 due to the interaction between pinions 145 and rack 530. The rotation of spinner arm shafts 110 cause tapered helical arrays 120 to be angularly positioned relative to power beds 150 such that a magnetic repulsive force pushes the spinner arms 100 out of the power beds 150, with each spinner arm moving towards the next power bed in power track 550 such that the similar magnetic interactions occur between the subsequent power bed and the spinner arm. The length of the power beds 150 and the changing orientations of the magnets comprising tapered helical arrays 120 cause spinner arms 100 to experience magnetic forces which, in aggregate, cause the rotation of hub 540 and stator shaft 510 about their axes.

Stator plate 520 is fixed so that stator shaft 510 may be coupled to a generator or other load such as a gear box, wheel, or fan. With the polar orientations of the spinner magnets 125 and array magnets 480 as discussed above, hub 540 tends to rotate in direction DR50, causing tapered helical arrays 120 to follow power track 550 in the direction DT50. In another embodiment, spinner magnets 125 could have an opposite orientation, tending to have the effect that hub 540 would rotate in a direction opposite to DR50.

In other embodiments, a circular configuration such as that shown in FIG. 5 may be modified to accommodate fewer or more power beds in a power track, such as, for example, eight power beds spaced 45° apart or three power beds spaced 120° apart. The circular configuration may further be modified to have fewer or more spinner arms, such as, for example, two spinner arms spaced 180° apart or eight spinner arms spaced 45° apart. In embodiments with fewer power beds, the arrays 160 and 170 of magnets 480 may be comprised of greater numbers of magnets 480 and the pinions 145 and rack 530 are geared such that the spinner arms 100 have fewer rotations about their axes per rotation of hub 540. In such embodiments, arrays 160 and 170 may approximate the curvature of the power track 550. In embodiments having greater numbers of power beds, the arrays 160 and 170 of magnets 480 may be comprised of fewer numbers of magnets 480 and the pinions 145 and rack 530 are geared such that the spinner arms 100 have more rotations about their axes per rotation of hub 540.

Moreover, in other embodiments, the circular configuration of FIG. 5 may be modified to have two or more concentric power tracks. In an exemplary such configuration, spinner arm 100 may be modified to have two tapered helical arrays 120 affixed to a single spinner shaft (not shown) such that one of the two tapered helical arrays interacts with an inner power track and the other with an outer power track. In such a configuration, the number and arrangement of power bed magnets may differ between the inner power track and the outer power track in order to compensate for the differing ratios of spinner rotation to spinner arm translational motion due to the differing circumferences of the power tracks. In another multi-concentric-track embodiment (not shown), coaxial spinners may rotate at different rates and have independent pinion racks. The number of power tracks per each stator plate assembly, the number of power beds per power track, the strength of magnets 480 and 125, and the number of spinners are among factors determining the torque and power of assembly 500.

Stator plate 520 may be made of a non-ferrous metal, preferably aluminum. Using aluminum as stator plate 520 prevents induction of the magnetic flux from power beds 150 into stator plate 520.

Pinion rack 530, in conjunction with pinion gear 145, provides for spinner 100 to rotate about its axis at a predetermined rate as the spinner arm 100 moves in a translational direction through a power bed 150. Pinion gear 145 may optionally be fitted with a set screw and/or shaft key (not shown), permitting the spinner arm 100, in a maintenance operation, to be rotated about its axis without advancing the spinner arm 100 in a translational direction relative to pinion rack 530. This allows fine-tuning of initial configurations, including the angular position of the tapered helical array 120 about its axis in relation to its translational displacement relative to a power bed 150. Such fine-tuning permits an optimal orientation, for example minimizing repulsive forces between the tapered helical array 120 and power bed magnets 480 to permit lower force translational movement of the spinner arm 100 towards the power bed 150 and to translationally push the spinner arm 100 out at the proper point with greater force. The pinion rack to pinion gear ratio may be selected in relation to the number and length of power beds 150 on stator plate assembly 500.

Figure 6:
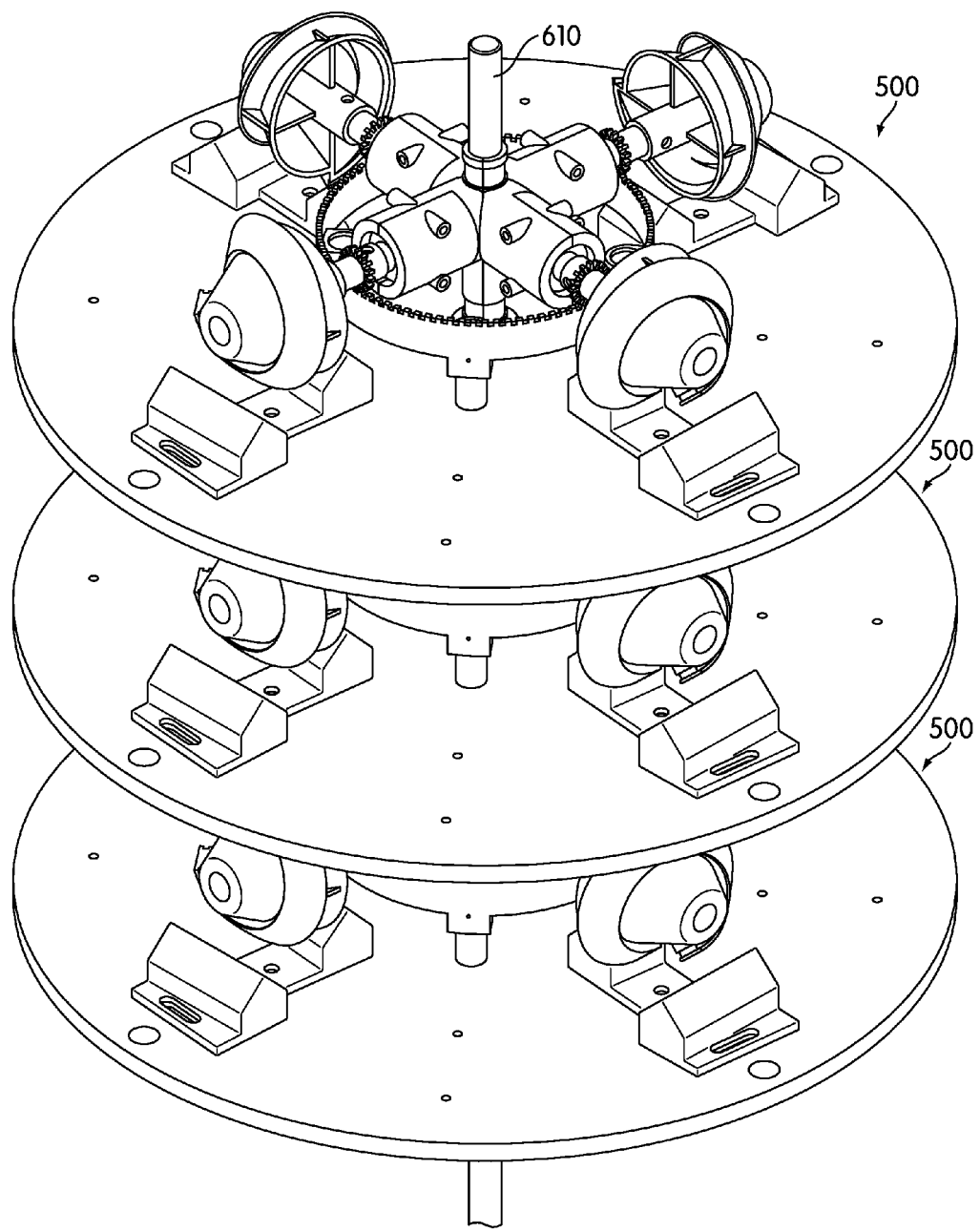
FIG. 6 illustrates a tower-type assembly of stator plate assemblies.

Additionally, as shown in FIG. 6, the stator plate assemblies 500 can be stacked on top of each other and coupled to a single stator shaft 610, further scaling up available torque.

Figure 7:
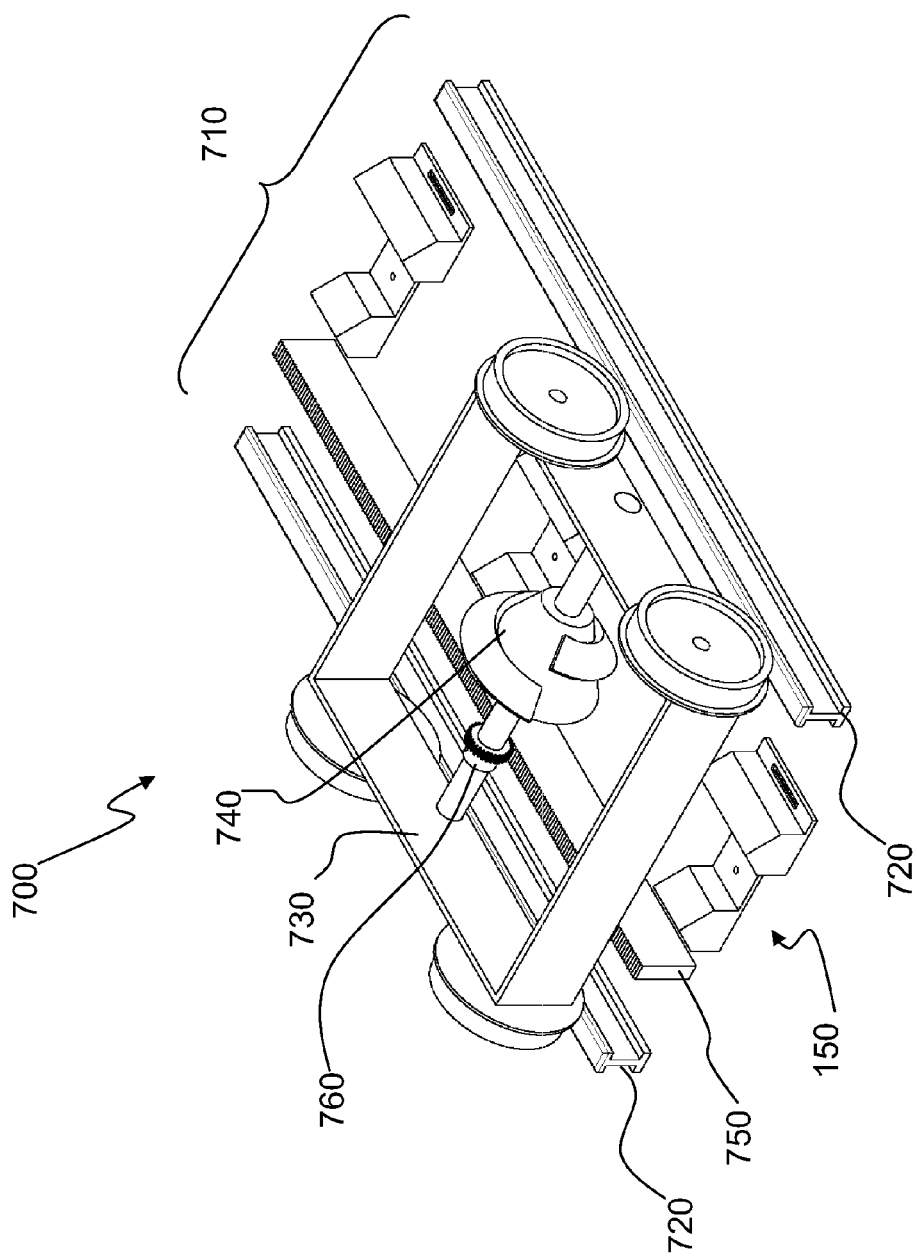
FIG. 7 illustrates a linear assembly in accordance with an aspect of the present invention

FIG. 7 illustrates another scaled embodiment of the invention. In this embodiment, multiple power beds 150 are spaced along a track 710 defined by rails 720 on which is mounted a car 730. Spinner arm 740 may be mounted on car 730 so that spinner arm 740 may interact with the power beds 150 spaced along the track. Track 710 also may include one or more racks 750 on which spinner arm pinion 760 may ride. Thus, spinner arm 740 may be configured to rotate and have the desired angular orientation with respect to their displacement from the power beds 150. In an alternate embodiment, more than one spinner arm 740 may be mounted on car 730.

Most of the parts are of non-ferrous material and of light weight to reduce the drag/torque and loss of magnetic flux and improve the output of the unit. The use of high power flux magnets helps to keep a unit in operation at an ambient temperature. This in turn reduces the maintenance and increases the output and longevity of the unit.

While various embodiments/variations of the invention have been described above, it should be understood that they have been presented by way of example only, and not limitation. Thus, the breadth and scope of the invention should not be limited by any of the above-described exemplary embodiments, but should be defined only in accordance with the following claims and their equivalents.

What is claimed is:

1. An apparatus for coupling magnetic forces into motive force, the apparatus comprising:
   a spinner arm, the spinner arm comprising:
      a helical array of magnets having an axis of rotation coincident with its helical axis;
      a spinner arm shaft onto which the helical array of magnets is mounted, wherein the axis of the spinner arm shaft is coincident with the helical axis and allows the helical array to rotate about its axis; and a rotational timing coupling;

a power bed, said power bed comprising an inner array of magnets and an outer array of magnets, wherein the inner and outer arrays define a power track of respective lines, said respective lines defining a power bed plane;

a translational timing coupling coupled to the rotational timing coupling of the spinner arm; and a hub into which the spinner arm shaft is inserted, allowing rotation of the spinner arm about its axis, said hub further constructed to allow the hub and spinner arm to move in a translational direction substantially along the power track defined by the power bed and;

wherein the spinner arm is orientable in a first translational displacement distal from the power bed and the helical array of magnets is orientable in a first angular orientation, such that a first magnetic force exists between the power bed and the spinner arm;

wherein, as the spinner arm moves in translational displacement towards the power bed, the respective timing couplings cause the spinner arm to rotate about the spinner arm axis in relation to the displacement of the spinner arm;

wherein the spinner arm is orientable in a second translational displacement proximal to the power bed and the helical array of magnets is orientable in a second angular orientation, such that a second magnetic force between the power bed and the spinner arm repels the spinner arm from the second translational displacement position and away from the power bed in the translational direction;

wherein the second magnetic force is greater than the first magnetic force; and wherein a load may be coupled to the hub.

2. The apparatus of claim 1 wherein one or more magnets are arranged to overlap a preceding magnet in the helical array.

3. The apparatus according to claim 1 wherein said magnets are rare earth magnets of high coercive force.

4. The apparatus according to claim 3 wherein said rare earth magnets are neodymium magnets.

5. The apparatus according to claim 1 where one or both of said inner and outer arrays of magnets are comprised of magnets of increasing size from a leading end of the array to a central portion of the array and of decreasing size from the central portion of the array to a trailing end of the array.

6. The apparatus according to claim 5 wherein the sizes of the power bed magnets are selected to achieve an arc shaped flux path.

7. The apparatus according to claim 1 further comprising:

a stator plate to which the power bed and translational timing coupling are fastened; and a shaft perpendicular to the stator plate;

wherein the hub is coupled to the perpendicular shaft, the power bed plane and a plane defined by the stator plate are parallel, the power track comprises substantially concentric arcs, a translational movement of the spinner arm causes the hub to rotate the perpendicular shaft, and the load is coupled to the perpendicular shaft.

8. The apparatus according to claim 7 further comprising a plurality of power beds and a plurality of spinner arms.

9. A tower generator comprising a plurality of apparatuses according to claim 8 in which said apparatuses share a common perpendicular shaft and load and the load is a generator.

10. A motor comprising the apparatus of claim 8.

11. The apparatus of claim 1 wherein the helical array of magnets is tapered.

12. The apparatus of claim 1 wherein a perpendicular to a pole face of each magnet of the helical array lies substantially in a plane passing through the helical axis and said perpendicular intersects the helical axis, forming an inclination angle and wherein a common pole of each magnet of the helical array is directed away from the helical axis.

13. The apparatus of claim 1 wherein the spinner arm shaft and the hub have mating bearing surfaces.

14. The apparatus of claim 1 wherein a common pole of each of the magnets in each array of magnets in the power bed is oriented in a common direction along said respective lines.

15. The apparatus of claim 1 wherein the respective lines may vary from parallel such that an angle between said respective lines is in a range of 0-15°.

16. The apparatus of claim 1 wherein the translational timing coupling is fixed relative to the power bed.

* * * * *